US009531250B2

(12) United States Patent
Arisawa et al.

(10) Patent No.: US 9,531,250 B2
(45) Date of Patent: Dec. 27, 2016

(54) POWER CONVERSION DEVICE AND REFRIGERATION/AIR-CONDITIONING SYSTEM

(75) Inventors: Koichi Arisawa, Tokyo (JP); Takuya Shimomugi, Tokyo (JP); Yosuke Shinomoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 703 days.

(21) Appl. No.: 14/002,173

(22) PCT Filed: Mar. 4, 2011

(86) PCT No.: PCT/JP2011/055102
§ 371 (c)(1), (2), (4) Date: Aug. 29, 2013

(87) PCT Pub. No.: WO2012/120600
PCT Pub. Date: Sep. 13, 2012

(65) Prior Publication Data
US 2013/0334884 A1 Dec. 19, 2013

(51) Int. Cl.
*H02M 1/32* (2007.01)
*H02M 3/158* (2006.01)
(Continued)

(52) U.S. Cl.
CPC ............... *H02M 1/32* (2013.01); *H02M 3/158* (2013.01); *H02M 7/06* (2013.01);
(Continued)

(58) Field of Classification Search
CPC ................................ H02M 1/32; H02M 3/158
See application file for complete search history.

(56) References Cited

U.S. PATENT DOCUMENTS 3,870,943 A * 3/1975 Weischedel ......... H02M 3/3378 363/26
5,930,133 A * 7/1999 Morizuka ............... H01L 29/88 257/E29.339
(Continued)

FOREIGN PATENT DOCUMENTS

EP 2 624 424 A1 8/2013
EP 2 672 619 A1 12/2013
(Continued)

OTHER PUBLICATIONS

Extended European Search Report dated Jul. 15, 2014 issued in corresponding EP patent application No. 11860447.9.
(Continued)

*Primary Examiner* — Thienvu Tran
*Assistant Examiner* — Pinping Sun
(74) *Attorney, Agent, or Firm* — Posz Law Group, PLC

(57) ABSTRACT

A power conversion device according to the present invention includes a power supply, a booster unit (a reactor, a switch) that boosts a voltage supplied from the power supply by switching control, a smoothing circuit that smoothes an output voltage from the booster unit, a rectifier that is arranged between the booster unit and the smoothing circuit to prevent a current reverse flow toward the booster unit, and a commutation unit that is connected to the rectifier in parallel to commutate a current flowing through the rectifier toward itself.

18 Claims, 16 Drawing Sheets

(51) Int. Cl.
*H02M 7/06* (2006.01)
*H02M 1/00* (2006.01)

(52) U.S. Cl.
CPC .. *H02M 2001/0051* (2013.01); *Y02B 70/1491* (2013.01); *Y10T 307/50* (2015.04)

(56) References Cited

U.S. PATENT DOCUMENTS

| | | | | |
|---|---|---|---|---|
| 6,377,481 | B1 | 4/2002 | Mantov | |
| 7,480,159 | B2 * | 1/2009 | Wei | H02M 3/335<br>363/21.1 |
| 7,635,971 | B2 * | 12/2009 | Tago | H03K 3/0231<br>323/350 |
| 9,287,792 | B2 * | 3/2016 | Telefus | H02M 3/33592 |
| 2002/0097029 | A1 * | 7/2002 | Mantov | H02M 1/34<br>323/222 |
| 2005/0190583 | A1 * | 9/2005 | Morimoto | H02M 1/34<br>363/24 |
| 2005/0226012 | A1 * | 10/2005 | Jovanovic | H02M 1/34<br>363/59 |
| 2007/0229022 | A1 * | 10/2007 | Hanafusa | H01M 10/42<br>320/101 |
| 2008/0304301 | A1 * | 12/2008 | Nishio | H02M 7/487<br>363/132 |
| 2009/0091957 | A1 * | 4/2009 | Orr | H02M 1/4225<br>363/79 |
| 2011/0019452 | A1 * | 1/2011 | Shinomoto | H02M 1/4208<br>363/126 |

FOREIGN PATENT DOCUMENTS

| | | | |
|---|---|---|---|
| JP | 59-117459 | A | 7/1984 |
| JP | 10-327585 | A | 12/1998 |
| JP | 2005-160284 | A | 6/2005 |
| JP | 2006-006061 | A | 1/2006 |
| JP | 2006-067696 | A | 3/2006 |
| JP | 2008-061403 | A | 3/2008 |
| WO | 2012/042579 | A1 | 4/2012 |

OTHER PUBLICATIONS

Office Action dated Sep. 12, 2014 issued in corresponding AU patent application No. 2011361876.
Extended European Search Report dated Apr. 7, 2015 issued in corresponding EP patent application No. 14195453.7.
International Search Report of the International Searching Authority mailed May 10, 2011 for the corresponding international application No. PCT/JP2011/055102 (with English translation).

* cited by examiner

POWER CONVERSION DEVICE AND REFRIGERATION/AIR-CONDITIONING SYSTEM

CROSS REFERENCE TO RELATED APPLICATION

This application is a U.S. national stage application of International Application No. PCT/JP2011/055102 filed on Mar. 4, 2011.

FIELD

The present invention relates to a power conversion device and a refrigeration/air-conditioning system using the power conversion device.

BACKGROUND

Application fields of various power conversion devices have been developed as variable voltage/variable frequency inverters are put to practical use.

With regard to power conversion devices, development of an application technique of a step-up/step-down converter has been widely in progress. Along with this development, in recent years, development of wide bandgap semiconductors has been widely in progress. The wide bandgap semiconductor has characteristics such as a higher voltage resistance, a lower power loss, and being capable of operating under a higher temperature, as compared with conventional semiconductors, and thus has been put to practical use mainly in rectifiers with regard to an element having a small current capacity (see, for example, Patent Literatures 1 to 4).

CITATION LIST

Patent Literatures

Patent Literature 1: Japanese Patent Application Laid-open No. 2005-160284

Patent Literature 2: Japanese Patent Application Laid-open No. 2006-067696

Patent Literature 3: Japanese Patent Application Laid-open No. 2006-006061

Patent Literature 4: Japanese Patent Application Laid-open No. 2008-061403

SUMMARY

Technical Problem

However, among new devices having a low power loss and high efficiency, an element having a large current capacity has many problems in order to put it to practical use, the problems including a high cost, crystal defects, and the like. Therefore, it is considered that more time is required for popularization thereof, and it is difficult to realize high efficiency of an element having a large current capacity by applying a new device having a large current capacity to the power conversion device.

The present invention has been achieved to solve the above problems, and an object of the present invention is to provide a power conversion device and a refrigeration/air-conditioning system that can ensure high efficiency and high reliability without using any new device having a large current capacity.

Solution to Problem

In order to solve the abovementioned problem and achieve the object, a power conversion device according to the present invention includes a power supply unit; a booster unit that boosts a voltage supplied from the power supply unit by switching control; a smoothing unit that smoothes an output voltage from the booster unit; a backflow prevention element that is arranged between the booster unit and the smoothing unit to prevent a current reverse flow toward the booster unit; and a commutation unit that is connected to the backflow prevention element in parallel to commutate a current flowing through the backflow prevention element toward the commutation unit itself.

Advantageous Effects of Invention

According to the present invention, control can be executed so that a reverse bias is applied to a rectifier, which is a backflow prevention element, after a forward current flowing through the rectifier is commutated toward a commutation unit. With this configuration, a recovery current of the rectifier can be suppressed, thereby enabling to realize a highly reliable and highly efficient power conversion device.

DESCRIPTION OF EMBODIMENTS

Exemplary embodiments of a power conversion device and a refrigeration/air-conditioning system according to the present invention will be explained below in detail with reference to the accompanying drawings. The present invention is not limited to the embodiments.

First Embodiment

Figure 1:
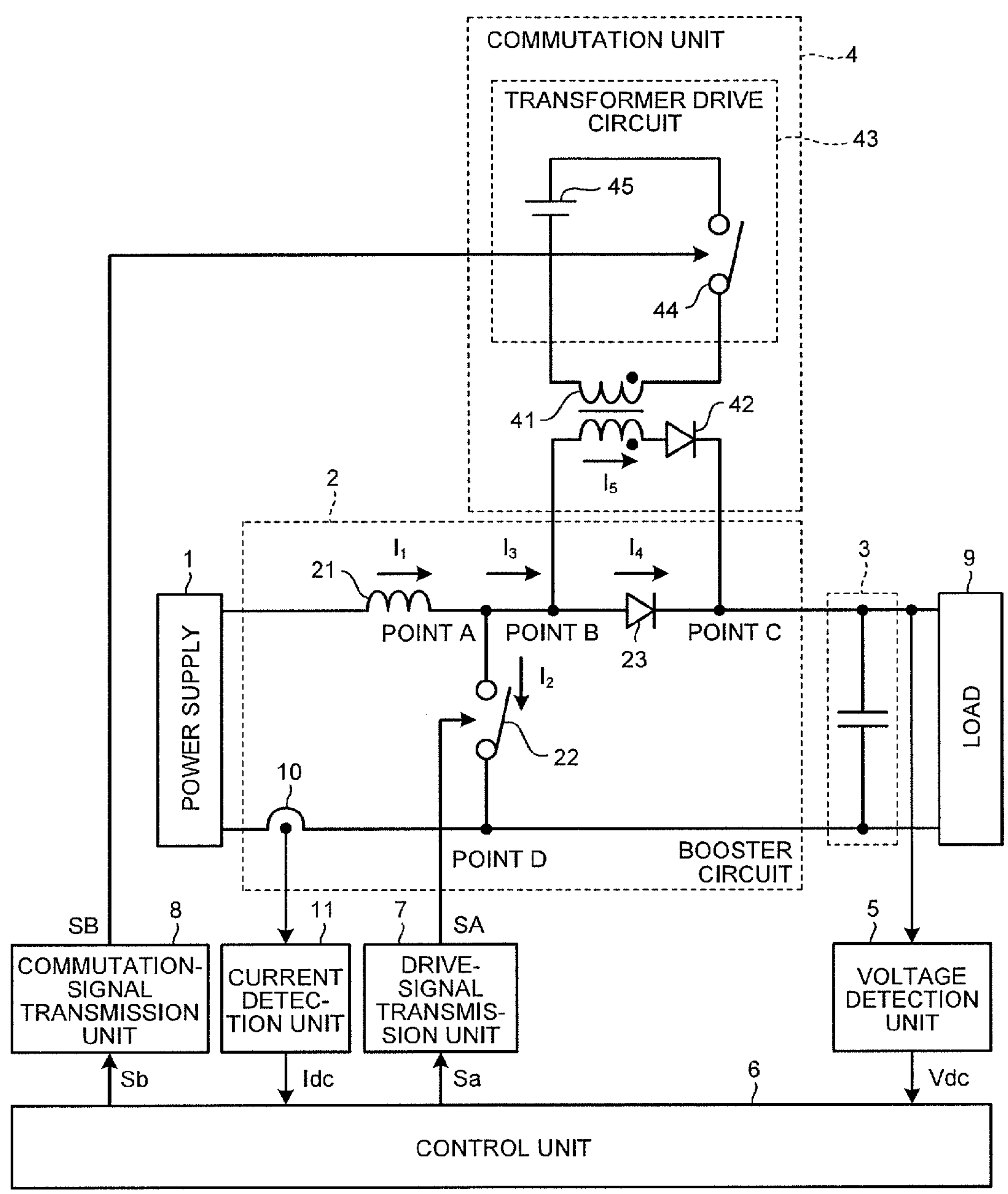
FIG. 1 is a configuration example of a power conversion device according to a first embodiment.

FIG. 1 is a configuration example of a power conversion device according to a first embodiment of the present invention. For example, the power conversion device is used in a refrigeration/air-conditioning system. The configuration of the power conversion device is explained first with reference to FIG. 1.

As shown in FIG. 1, the power conversion device according to the present embodiment includes a power supply 1 that supplies power, a booster circuit 2 that boosts power supplied from the power supply 1, a smoothing circuit 3 that smoothes an output voltage from the booster circuit 2 or a commutation unit 4, which is described later, the commutation unit 4 that commutates a current flowing through the booster circuit 2 to a different path at a required timing, a voltage detection unit 5 that detects a voltage after being smoothed by the smoothing circuit 3, a control unit 6 that controls the booster circuit 2 and the commutation unit 4, a drive-signal transmission unit 7 that transmits a drive signal Sa of the booster circuit 2 generated by the control unit 6 to the booster circuit 2, a commutation-signal transmission unit 8 that transmits a drive signal Sb (also referred to as "commutation signal") of the commutation unit 4 generated by the control unit 6 to the commutation unit 4, a load 9 that is connected to the smoothing circuit 3 at the subsequent stage, a current detection element 10 that detects the current flowing through the booster circuit 2, and a current detection unit 11 that converts a detection result obtained by the current detection element 10 to a signal in a format usable by the control unit 6.

An ACCT (current transformer) or a DCCT (using a Hall element, a Hall IC, or the like) is mainly used as the current detection element 10. The current detection unit 11 includes an amplifier circuit, a level-shift circuit, a filter circuit, and/or the like for converting a value detected by the current detection element 10 to an appropriate value (Idc) that can be processed in the control unit 6 to allow it to be acquired. When the function of the current detection unit 11 is included in the control unit 6, the current detection unit 11 may be omitted as appropriate. When any current control is not executed (when being applied to a device that does not require any control taking into consideration the current value flowing through the booster circuit 2), the current detection element 10 and the current detection unit 11 may be omitted as appropriate.

The booster circuit 2 includes a reactor 21 connected to the positive side of the power supply 1, and a switch 22 as a switching element and a rectifier 23 as a backflow prevention element (the point B side is the anode side, and the point C side is the cathode side) that are connected at the reactor 21 at the subsequent stage. The reactor 21 can be connected to the negative side of the power supply 1. The switching state of the switch 22 is changed by a drive signal SA input from the drive-signal transmission unit 7. The booster circuit 2 boosts input power from the power supply 1 in accordance with an "ON" time to "OFF" time ratio (duty ratio) of the drive signal SA. The drive-signal transmission unit 7 is normally formed of a buffer, a logic IC, a level-shift circuit, and/or the like. However, the drive-signal transmission unit 7 can be omitted as appropriate, for example when the function of the drive-signal transmission unit 7 is provided in the control unit 6. In this case, the drive signal Sa generated by the control unit 6 serves as the drive signal SA, thereby directly performing a switching operation of the switch 22.

The commutation unit 4 includes a transformer 41, a rectifier 42 serially connected to the transformer 41, and a transformer drive circuit 43 that drives the transformer 41. In FIG. 1, the polarity of a primary winding and the polarity of a secondary winding of the transformer 41 are made the same. The secondary winding of the transformer 41 is serially connected to the rectifier 42. The rectifier 42 is further connected to the rectifier 23 of the booster circuit 2 in parallel. The rectifier 42 operates as a backflow prevention element in the commutation unit 4.

The transformer drive circuit 43 includes, for example, a power supply 45 and a switch 44 for driving the transformer 41. A limiting resistor, a high-frequency capacitor, a snubber circuit, a protection circuit, and/or the like can be inserted, as required, into a path of the power supply 45, the switch 44, and the primary winding of the transformer 41, taking into consideration a measure against noise and protection at the time of failure. In the example shown in FIG. 1, a reset winding that resets an excitation current is not provided in the transformer 41; however, the reset winding can be added to the primary winding as required, and a rectifier or the like can be provided to regenerate excitation energy to the power supply side. This can enhance efficiency.

The switching state of the switch 44 is changed by a commutation signal SB input from the commutation-signal transmission unit 8. The commutation-signal transmission unit 8 is normally formed of a buffer, a logic IC, a level-shift circuit, and/or the like as in the drive-signal transmission unit 7. However, when the function of the commutation-signal transmission unit 8 is provided in the control unit 6, the commutation-signal transmission unit 8 may be omitted as appropriate. In this case, the commutation signal Sb generated by the control unit 6 serves as the commutation signal SB, thereby directly performing a switching operation of the switch 44.

The voltage detection unit 5 is formed of a level-shift circuit by a partial resistance or the like. An analog/digital converter can be added as required so that a detection value can be computed in the control unit 6.

The control unit 6 controls the booster circuit 2 and the commutation unit 4 based on at least one of a voltage value Vdc indicating a voltage detection result obtained by the voltage detection unit 5 and a current value Idc indicating a current detection value obtained by the current detection unit 11. The control unit 6 can be formed of an arithmetic device such as a microcomputer or a digital signal processor, or a device having the same function inside thereof.

An operation of the power conversion device shown in FIG. 1 is explained next. In the following explanations, it is assumed that the control unit 6 includes functions similar to those of the drive-signal transmission unit 7 and the commutation-signal transmission unit 8 (the drive-signal transmission unit 7 and the commutation-signal transmission unit 8 are omitted) to simplify the explanations.

The operation of the power conversion device according to the present embodiment is such that a commutation operation of the rectifier is added to a boost chopper. There are four operation modes in total corresponding to combinations of the switching states of the switch 22 and the switch 44. It is assumed here that a recovery characteristic of the rectifier 42 is better than that of the rectifier 23.

(First Mode)

Figure 2A:
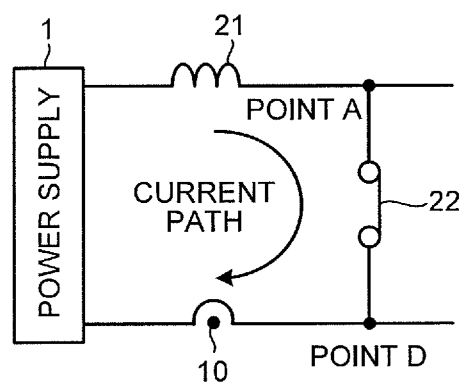
FIG. 2A is an explanatory diagram of an operation mode in the power conversion device.

A case where the switch 22 is ON and the switch 44 is OFF is considered. An element having a lower forward voltage is used as the rectifier 23, as compared with the rectifier 42 having the better recovery characteristic. Because the winding of the transformer 41 is an inductor component, when an excitation current does not flow, the current does not flow. Accordingly, in the case where the switch 44 is OFF, the current does not flow into the path of the commutation unit 4. Because the switch 22 is ON, energy is accumulated in the reactor 21 by a path shown in FIG. 2A.

(Second Mode)

Figure 2B:
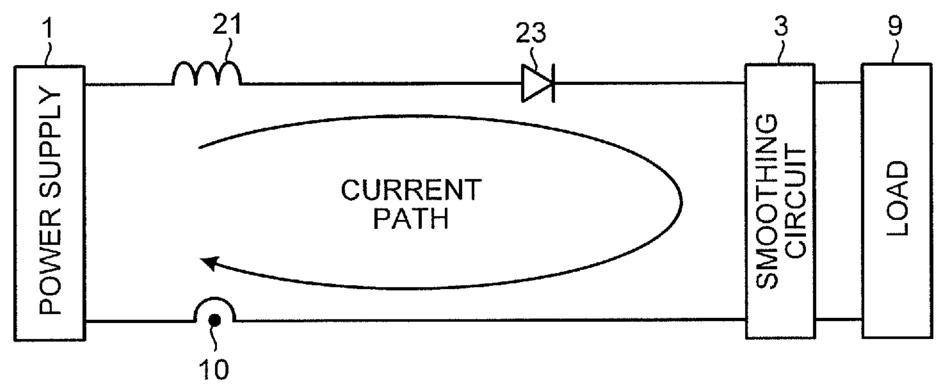
FIG. 2B is an explanatory diagram of an operation mode in the power conversion device.

A case where the switch 22 is OFF and the switch 44 is OFF is considered. Also in this case, the switch 44 is OFF as in the first mode, and thus the current does not flow into the path of the commutation unit 4. Furthermore, because the switch 22 is OFF, the energy of the reactor 21 is supplied to the load 9 in a path shown in FIG. 2B.

(Third Mode)

Figure 2C:
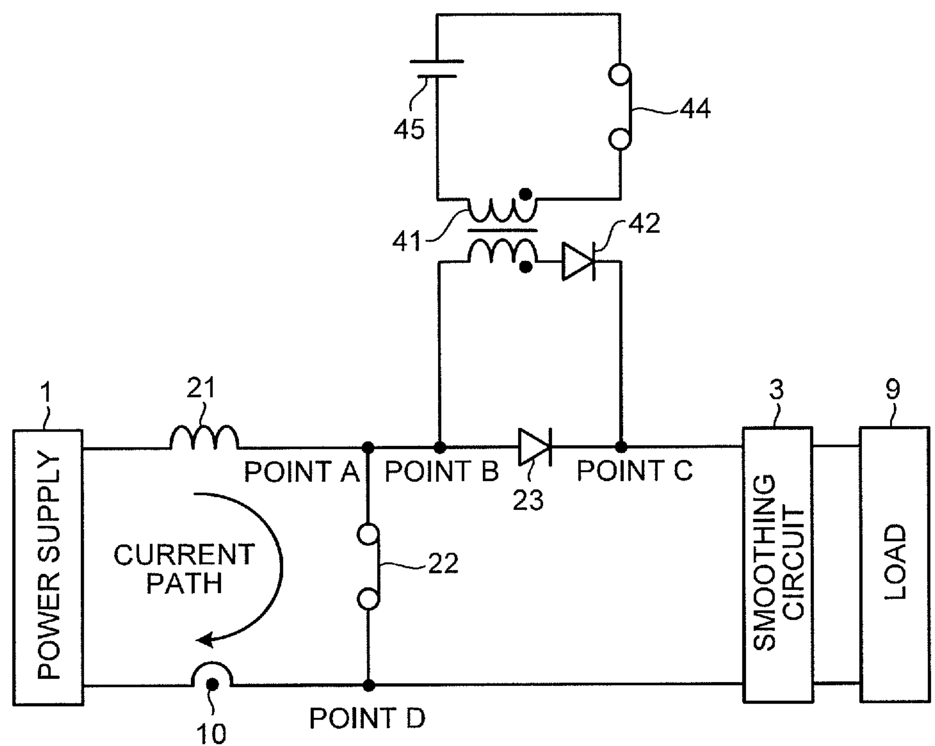
FIG. 2C is an explanatory diagram of an operation mode in the power conversion device.

A case where the switch 22 is ON and the switch 44 is ON is considered. In this case, although the switch 44 is ON, the switch 22 is ON simultaneously. Because the impedance is lower on the power supply 1 side, almost no current flows into the path of the commutation unit 4, and energy is accumulated in the reactor 21 in a path shown in FIG. 2C. This mode may be generated instantaneously due to transmission delay of the commutation signal SB or the like; however, it does not cause any problem in use.

(Fourth Mode)

Figure 2D:
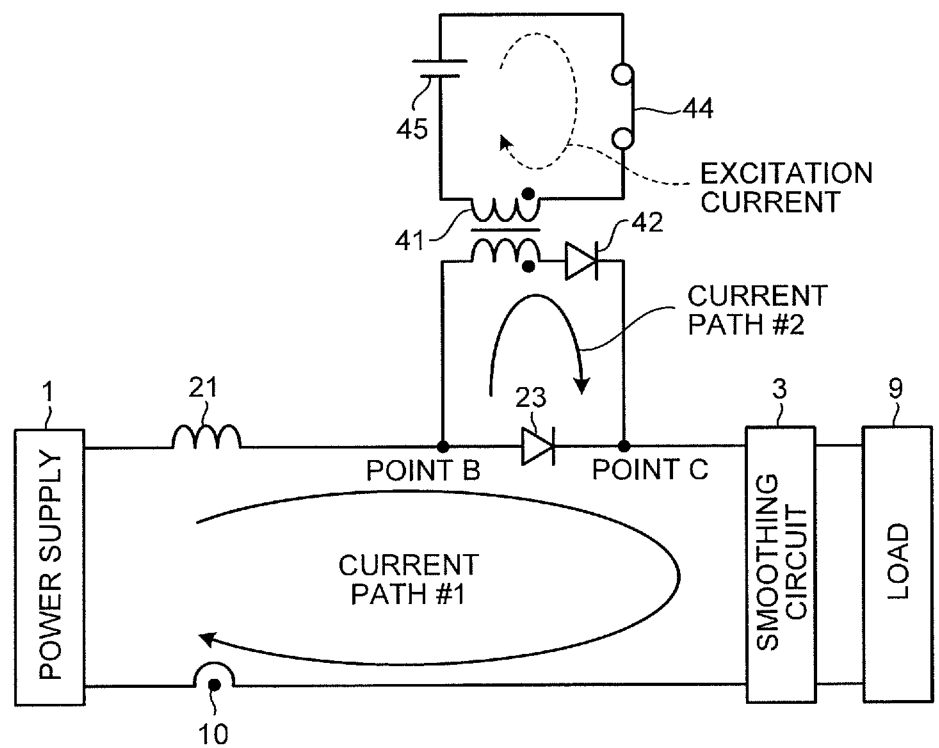
FIG. 2D is an explanatory diagram of an operation mode in the power conversion device.

A case where the switch 22 is OFF and the switch 44 is ON is considered. In this case, the switch 22 is OFF and the current flows toward the load 9 via the rectifier 23 (a current path #1 shown in FIG. 2D). Furthermore, because the switch 44 is ON, the transformer 41 is excited, and the current also flows into the path of the commutation unit 4 (a current path #2 shown in FIG. 2D). When a certain time has passed after the switch 22 and the switch 24 are turned on, the current flowing in the current path #1 (the rectifier 23) is completely commutated toward the rectifier 42.

As described above, although a commutation operation is generated in the case of the fourth mode (the switch 22 is OFF and the switch 44 is ON), an energy accumulation operation by switching of the switch 22 follows a pattern of the booster chopper. Therefore, when switching is repeatedly performed by the switch 22 such that the switch 22 is turned on during an ON time $T_{on}$ and off during an OFF time $T_{off}$, an average voltage $E_c$ expressed by the following equation (1) is obtained at the point C shown in FIG. 1. Here, for simplification, the voltage of the power supply 1 is assumed to be a DC power supply $E_1$.

$$E_c = \frac{T_{on} + T_{off}}{T_{off}} \cdot E_1 \tag{1}$$

Figure 3:
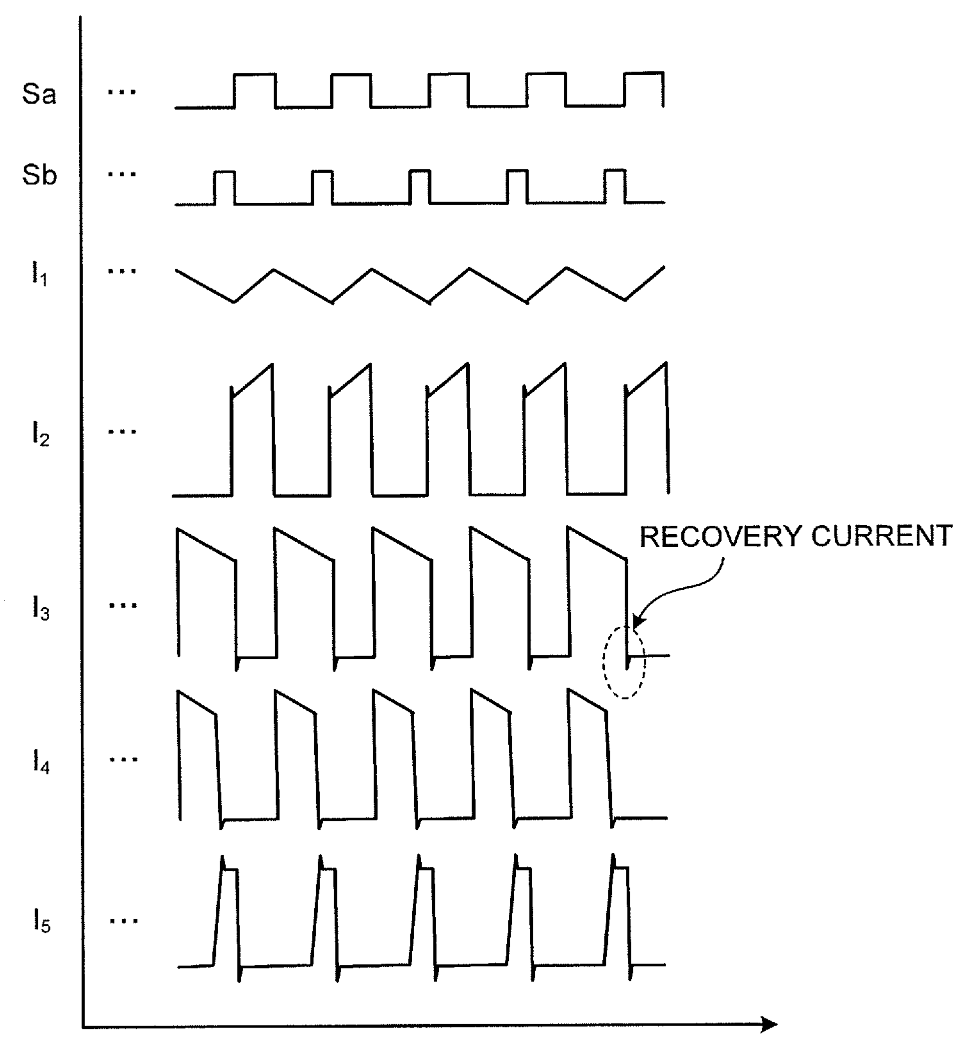
FIG. 3 is an example of a commutation control operation.

FIG. 3 is an example of a commutation control operation performed by the power conversion device. Specifically, FIG. 3 represents a relation among the drive signal Sa (a drive signal for controlling the booster circuit 2) and the drive signal Sb (a commutation signal for controlling the commutation unit 4) output by the control unit 6, and respective current waveforms $I_1$ to $I_5$ shown in FIG. 1. In the output signals Sa and Sb from the control unit 6, the HI side corresponds to the active direction (ON direction). Furthermore, the respective waveforms are shown in a state after a sufficient time has passed since power on of the power supply 1, that is, a state after the control unit 6 has controlled the ON time and the OFF time of the drive signal Sa so that the load 9 and the output voltage Vdc have a constant output.

Furthermore, FIG. 3 is an example in which the “ON” time to “OFF” time ratio (duty ratio) of the drive signal Sa is substantially constant. That is, the “ON” time to “OFF” time ratio is set constant, assuming the case where the power supply 1 is a DC power supply. When the power supply 1 is an AC power supply, for example, the “ON” time to “OFF” time ratio (duty ratio) of the drive signal Sa only needs to be adjusted by proportional-integral control or the like so that the voltage on the DC side becomes constant. Furthermore, FIG. 3 is a waveform example when the pulse width of the drive signal Sb is fixed. A case where the pulse width of the drive signal Sb is set to be variable is explained separately.

$I_1$ represents a current flowing in the reactor 21. $I_1$ is branched at the point A in FIG. 1, and divides into a current $I_2$ flowing in the switch 22 and a current $I_3$ flowing toward the rectifier 23. Therefore, the relation of these current values is shown by the following equation (2).

$$I_1 = I_2 + I_3 \tag{2}$$

$I_3$ is branched at the point B, and divides into a current $I_4$ flowing in the rectifier 23 and a current $I_5$ flowing toward a secondary wining of the transformer 41 and the rectifier 42. Therefore, the relation of these current values is shown by the following equation (3).

$$I_3 = I_4 + I_5 \tag{3}$$

When the drive signal Sa is ON in the state where the forward current flows through the rectifier 23, conduction is established between the point A and the point D, and thus the potential at the point B becomes substantially equal to the potential at the point D (the point A and the point B have the same potential). For example, when an insulated gate bipolar transistor (IGBT) or a field-effect transistor (FET) is used as the switch 22, an ON voltage of these elements causes a potential difference between the point B and the point D (the potential of the point B becomes substantially equal to a negative side potential of the power supply 1). Meanwhile, the potential of the point C is substantially held in a state of charging potential (a charging potential of the capacitor constituting the smoothing circuit 3) by the smoothing circuit 3. Therefore, at this time, a reverse bias is applied to the rectifier 23 by as much as the potential difference between the point C and the point B, and the rectifier 23 shifts to an OFF operation.

Generally, a pn junction diode is used as the rectifier 23. In this case, a short-circuit current flows in the path from the rectifier 23 to the switch 22, until reverse recovery of the rectifier 23 is complete (hereinafter, “recovery current”). Therefore, to prevent an increase in a circuit loss (a power loss) due to the recovery current, the control unit 6 turns on the commutation signal Sb of the commutation unit 4 in a predetermined period immediately before turning on the drive signal Sa. Accordingly, the current flowing through the rectifier 23 is commutated toward the commutation unit 4 (commutated to the rectifier 42 via the transformer 41) (see FIG. 2D).

An element that can endure a peak current repeatedly but has a small current capacity (rated) (an element having a high voltage resistance but a small current capacity), as compared with the rectifier 23, is used as the rectifier 42.

Generally, in a rectifier, an element having a smaller current capacity has a smaller amount of accumulated carriers than an element having a larger current capacity. Accordingly, as the current capacity decreases, the time until the reverse recovery is complete can be reduced, and the recovery current also decreases. The amount of accumulated carriers of the rectifier depends on the magnitude of the forward current. As the applied reverse bias voltage decreases, the recovery current decreases. Consequently, by turning on the commutation signal Sb to commutate the current flowing through the rectifier 23 toward the rectifier 42 before turning on the drive signal Sa, the recovery current flowing in the path from the rectifier 23 to the switch 22 can be reduced.

The rectifier 42 can be formed of a wide bandgap semiconductor formed of Sic, GaN, diamond, or the like. The wide bandgap semiconductor has a lower conduction loss and a lower switching loss than conventional semiconductors (non-wide bandgap semiconductors), and thus making it possible to enhance the efficiency of the power conversion device. Furthermore, because the wide bandgap semiconductor has a high voltage resistance and a high allowable current density, the rectifier can be downsized, and by using the downsized rectifier, the device can be also downsized.

In the above explanations, the duty ratio of the drive signal Sa is explained as being constant; however, a highly efficient operation may become possible by changing the output of the booster circuit as appropriate, due to such a reason that, for example, when the load 9 is an electric motor, a generated inductive voltage varies depending on a rotation frequency of the electric motor. Furthermore, because the required output voltage of the booster circuit is different depending on the specification of the electric motor, a required load torque, and operating conditions, the "ON" time to "OFF" time ratio (duty ratio) of the drive signal Sa is adjusted as appropriate. The adjustment process is performed in the control unit 6. For example, the adjustment process is realized by using a controller that executes proportional-integral (PI) control to execute proportional-integral control, using, as inputs, the actual output voltage Vdc obtained by the voltage detection unit 5 and a target voltage Vdc* (a command value) set in the control unit 6.

As a result, feedback control is executed so that the actual output voltage Vdc approaches the target value Vdc*, and the ON time of the drive signal Sa is successively corrected and set. After a certain time has passed, the Vdc and the Vdc* become substantially the same, excluding a steady-state deviation.

The Vdc* may be mapped as an internal memory, and the value thereof may be changed according to the operating conditions. Alternatively, control may be executed by storing the Vdc* in an external memory and reading the Vdc* into the control unit 6.

When current control is required, a reference signal (duty) of the drive signal Sa may be generated, taking into consideration the current value Idc obtained by the current detection element 10. The adjustment process is performed in the control unit 6. For example, two controllers that execute proportional-integral control are used. First, a first controller receives inputs of the actual output voltage Vdc obtained by the voltage detection unit 5 and the target voltage Vdc* (the command value) set in the control unit 6, to execute the proportional-integral control and outputs a current command value Idc*. Next, a second controller receives inputs of the current command value Idc* and a current detection value Idc to execute feedback control so that the actual output current Idc approaches the target value Idc*, to correct and set the ON time of the drive signal Sa successively. Also in this case, the Vdc and the Idc become substantially the target value (excluding a steady-state deviation) after a certain time has passed. Furthermore, by appropriately adjusting the Idc* depending on the power supply voltage, a power factor of the power supply can be improved and a high-frequency current can be suppressed.

A control dead time or the like needs to be considered according to use conditions. Therefore, the controllers may execute PID control combined with a derivative control action according to the conditions.

The Idc* may be mapped as an internal memory and the value thereof may be changed according to the operating conditions. That is, instead of obtaining the Idc* by the proportional-integral control or the like using the output voltage Vdc and the target voltage Vdc* (the command value), a plurality of Idc* values may be prepared, and an appropriate Idc* value according to the operating conditions may be used. Furthermore, control may be executed by storing the Idc* in an external memory and reading the Idc* into the control unit 6. Alternatively, control may be executed with an alternative amount such as electric power instead of the electric current.

In the above explanations, a method of performing the commutation operation is shown from the aspect of the drive signals of the switches 22 and 24. Meanwhile, the actual switching speed of the switches 22 and 24 changes according to the type of the element and various conditions of the drive circuit (setting of the constant of a gate peripheral circuit and the like). Therefore, even if a rise timing (an on-timing) of the drive signal Sb (SB) of the switch 44 and a fall timing (an off-timing) of the drive signal Sa (SA) of the switch 22 are set the same, actual switching timings of the switches 44 and 22 do not always coincide with each other. Furthermore, with regard to the drive signal Sb (SB) of the switch 22, it can be considered that the recovery suppression effect can be increased by adjusting a pulse width of the signal Sb (SB) in order to ensure the required commutation time. Therefore, a circuit having high versatility that can change the ON/OFF timing of the switches 44 and 22 is explained below.

Figure 4:
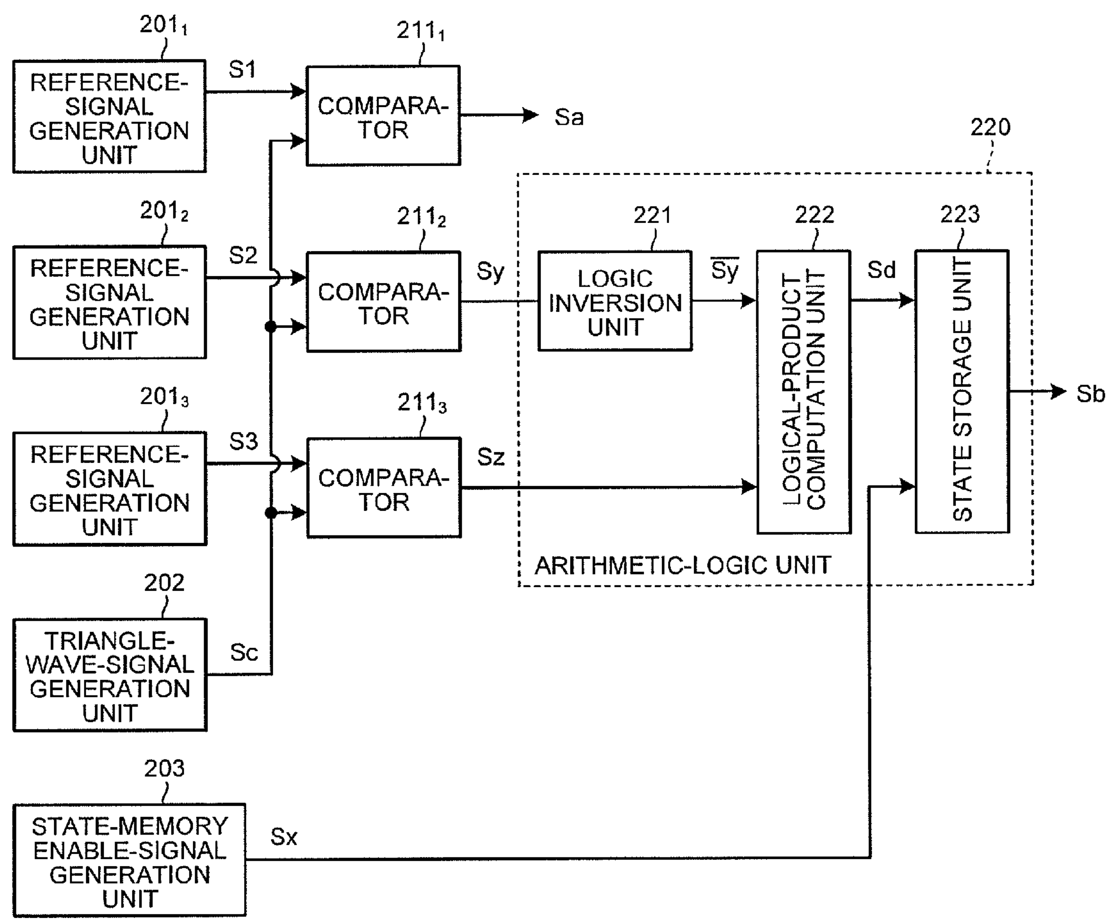
FIG. 4 is an example of a switch control unit.

FIG. 4 is an example of a switch control unit that generates switch drive signals (the drive signals Sa and Sb). The switch control unit is provided in the control unit 6. The switch control unit shown in FIG. 4 includes reference-signal generation units $\mathbf{201}_1$ to $\mathbf{201}_3$ that generate respective reference signals having different levels (fixed reference values), a triangle-wave-signal generation unit 202 that generates a triangle-wave signal, a state-memory enable-signal generation unit 203 that generates a state-memory enable signal (details thereof are described later), comparators $\mathbf{211}_1$ to $\mathbf{211}_3$ that compare two input signals, and an arithmetic-logic unit 220 including a logic inversion unit 221, a logical-product computation unit 222, and a state storage unit 223.

Figure 5A:
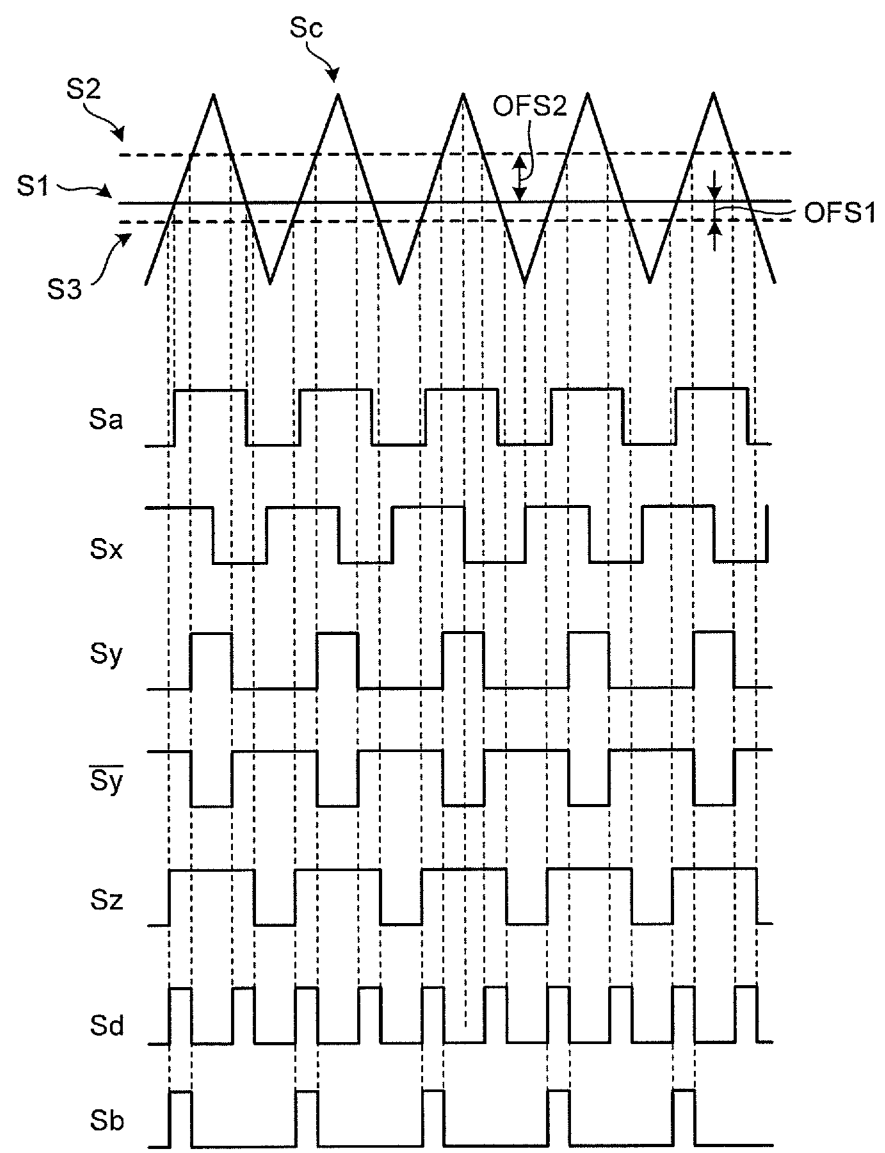
FIG. 5A is an example of a drive signal generated by the switch control unit.

FIG. 5A is an example of a drive signal generated by a switch control unit having the configuration shown in FIG. 4. Details of a switch drive-signal generation operation in the switch control unit are explained below with reference to FIGS. 4 and 5A.

In the generation operation of the switch drive signal, the reference-signal generation units $\mathbf{201}_1$ to $\mathbf{201}_3$ first generate a reference signal S1 (a first reference signal), a reference signal S2 (a second reference signal), a reference signal S3 (a third reference signal), respectively, as a threshold. It is assumed that these reference signals have a relation of $S3 \leq S1 \leq S2$ (see FIG. 5A). Furthermore, the triangle-wave-signal generation unit 202 generates a triangle-wave signal Sc. The state-memory enable-signal generation unit 203 generates a state-memory enable signal Sx that is HI in a first half section (a section from a valley to a peak) of the triangle-wave signal Sc and is LO in a second half section (a section from a peak to a valley) thereof. In the example shown in FIG. 5A, an example in which HI and LO are repeatedly output in a half cycle section of the triangle-wave signal is shown. However, the state-memory enable signal Sx may be flexibly changed according to, for example, operation specifications of a device (such as a refrigeration/air-conditioning system) connected as the load 9.

The comparator $\mathbf{211}_1$ generates the drive signal Sa based on the first reference signal S1 and the triangle-wave signal Sc. Specifically, the comparator $\mathbf{211}_1$ compares the triangle-wave signal Sc with the first reference signal S1, and when Sc is equal to or larger than S1 (Sc≥S1), outputs the HI-level drive signal Sa (ON). On the other hand, when Sc is smaller than S1 (Sc<S1), the comparator $\mathbf{211}_1$ outputs the LO-level drive signal Sa (OFF).

Similarly, the comparator $\mathbf{211}_2$ generates a signal Sy based on the second reference signal S2 and the triangle-wave signal Sc. Specifically, the comparator $\mathbf{211}_2$ compares the triangle-wave signal Sc with the second reference signal S2, and when Sc is equal to or larger than S2 (Sc≥S2), outputs the HI-level signal Sy. On the other hand, when Sc is smaller than S2 (Sc<S2), the comparator $\mathbf{211}_2$ outputs the LO-level signal Sy. Furthermore, the comparator $\mathbf{211}_3$ generates a signal Sz based on the third reference signal S3 and the triangle-wave signal Sc. Specifically, the comparator $\mathbf{211}_3$ compares the triangle-wave signal Sc with the third reference signal S3, and when Sc is equal to or larger than S3 (Sc≥S3), outputs the HI-level signal Sz. On the other hand, when Sc is smaller than S3 (Sc<S3), the comparator $\mathbf{211}_3$ outputs the LO-level signal Sz.

In the comparators $\mathbf{211}_1$ to $\mathbf{211}_3$, an active direction of the input and whether the output is to be HI or LO when the two values of the input signals are the same (in the case of Sc=S1, Sc=S2, Sc=S3) may be changed according to need.

The arithmetic-logic unit 220 generates the commutation signal Sb based on the signals Sx, Sy, and Sz. Specifically, the logic inversion unit 221 first generates a signal obtained by inverting the output signal Sy of the comparator $\mathbf{211}_2$ (in FIG. 5A, expressed by attaching overline to "Sy"), and then the logical-product computation unit 222 compares an input signal from the logic inversion unit 221 (a signal obtained by inverting Sy) with an input signal from the comparator $\mathbf{211}_3$ (Sz). When both inputs are HI, the logical-product computation unit 222 outputs an HI output signal Sd, and in other cases, outputs the LO output signal Sd. The state storage unit 223 then accepts a logic change of the output signal Sd of the logical-product computation unit 222 in a section in which the output signal Sx of the state-memory enable-signal generation unit 203 is HI, and holds and outputs the state. That is, when Sd is changed to HI in the above section, the commutation signal Sb is changed to HI, and when Sd is changed to LO, the commutation signal Sb is changed to LO. In other sections, the state of the commutation signal Sb is not changed. A D-latch circuit or the like may be used for the state storage unit 223.

By going through a series of logical processes described above, it is made possible to change the ON/OFF timing of the drive signal Sa of the booster circuit 2 and the drive signal Sb of the commutation unit 4 by a relatively simple method. Furthermore, not only an active change timing (a change timing from LO to HI) of the drive signal Sa and an OFF timing (a change timing from HI to LO) of the drive signal Sb of the commutation unit 4 can be synchronized, but also the ON/OFF timing of the drive signals Sa and Sb can be finely adjusted.

As can be understood from FIGS. 4 and 5A, when the relation between ON/OFF timings of the drive signals Sa and Sb is to be adjusted, a difference between the first reference signal S1 and the third reference signal S3 (OFS1 shown in FIG. 5A) and a difference between the first reference signal S1 and the second reference signal S2 (OFS2 shown in FIG. 5A) only need to be adjusted. When the ON/OFF timing of the drive signal Sa is to be adjusted, the value of the reference signal S1 only needs to be adjusted. When the ON/OFF timing of the drive signal Sb is to be finely adjusted, the value of the second reference signal S2 and the value of the third reference signal S3 only need to be adjusted.

Figure 5B:
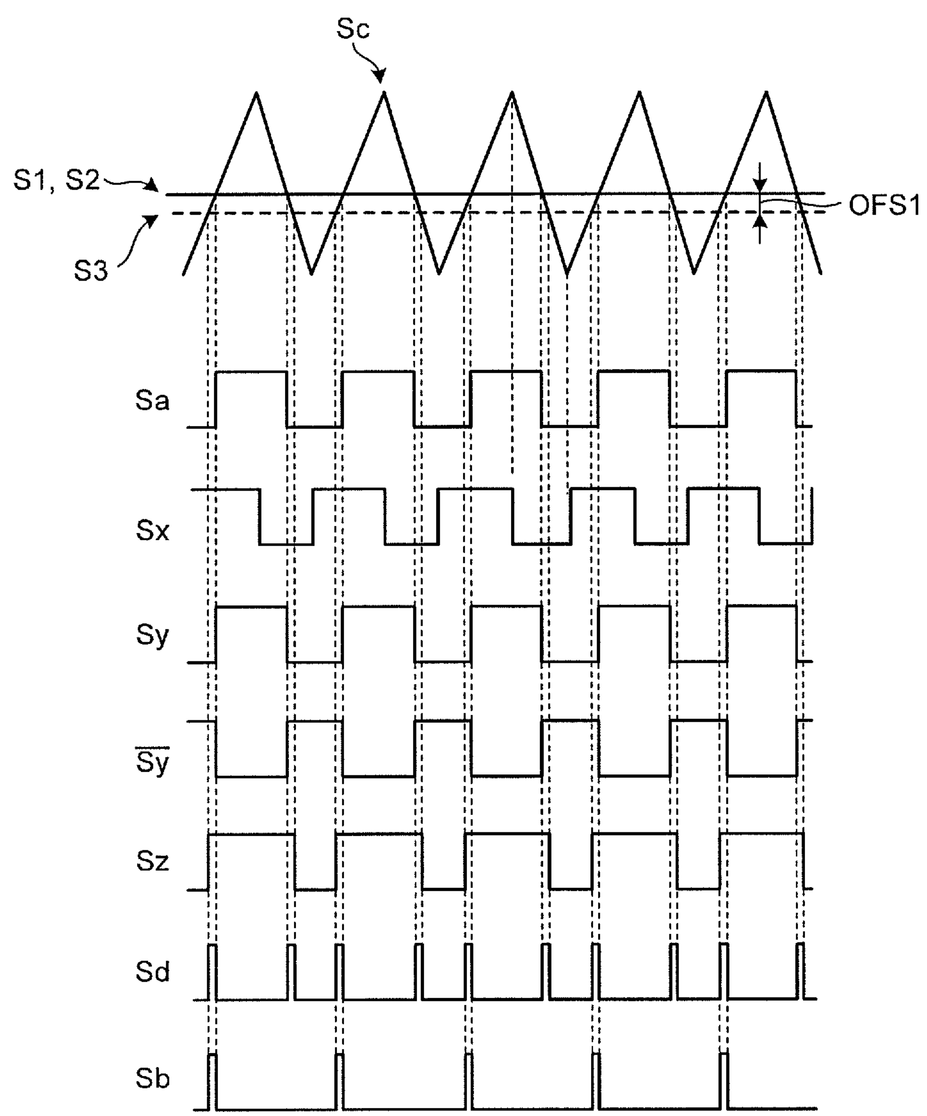
FIG. 5B is an example of a drive signal generated by the switch control unit.

As an example, control when it is desired to turn off the drive signal Sb without any delay (when it is desired to make the OFF timing of the drive signal Sb coincide with the ON timing of the drive signal Sa) is shown in FIG. 5B. As shown in FIG. 5B, by overlapping the first reference signal S1 and the second reference signal S2 on each other (by setting the OFS2 to zero), the OFF timing of the drive signal Sb can be made coincide with the ON timing of the drive signal Sa. Although illustration is omitted, when, according to the operation condition, the current flowing through the booster circuit 2 does not need to be commutated toward the commutation unit 4 before closing the switch 22 by turning on the drive signal Sa (when the switch 44 does not need to be closed by turning on the drive signal Sb), the drive signal Sb can be set OFF all the time by overlapping all the reference signals S1, S2, and S3 on each other (by setting the OFS1 and the OFS2 to zero).

According to the method described above, the ON/OFF timing of the drive signals Sa and Sb can be changed by a relatively simple method. As a result, re-commutation due to variations in characteristics of the drive circuit and the switching element can be prevented, and the recovery current can be suppressed highly reliably.

In the switch control unit shown in FIG. 4, the ON/OFF timings of the drive signal Sa of the booster circuit 2 and the drive signal Sb of the commutation unit 4 are adjusted by using a plurality of reference signals. However, the similar timing adjustment can be realized by using a plurality of triangle-wave signals. An example in which a timing adjustment is performed by using a plurality of triangle-wave signals is explained below.

Figure 6:
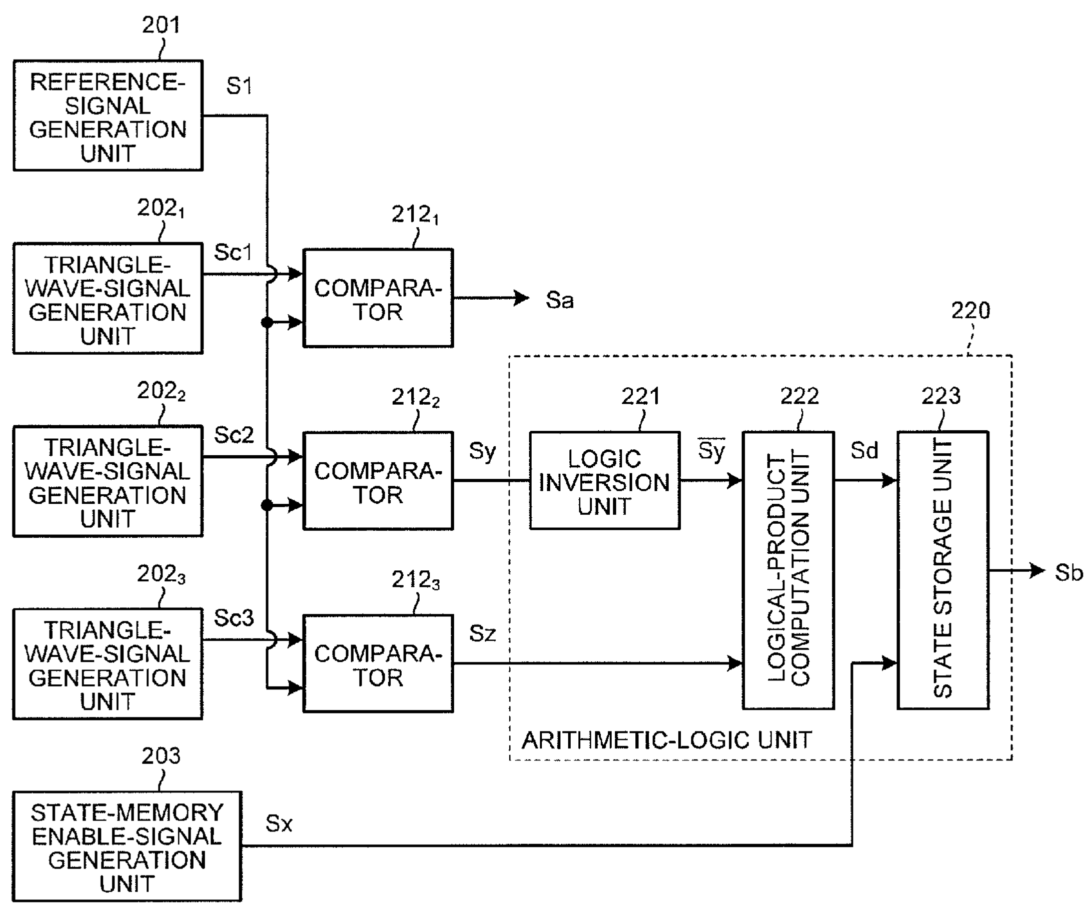
FIG. 6 is a modification of the switch control unit shown in FIG. 4.

FIG. 6 is a modification of the switch control unit shown in FIG. 4. The switch control unit includes a reference-signal generation unit 201 that generates a reference signal, triangle-wave-signal generation units $\mathbf{202}_1$ to $\mathbf{202}_3$ that generate respective triangle-wave signals different from each other, the state-memory enable-signal generation unit 203 that generates a state-memory enable signal, comparators $\mathbf{212}_1$ to $\mathbf{212}_3$ that compare two input signals, and the arithmetic-logic unit 220 including the logic inversion unit 221, the logical-product computation unit 222, and the state storage unit 223.

Figure 7A:
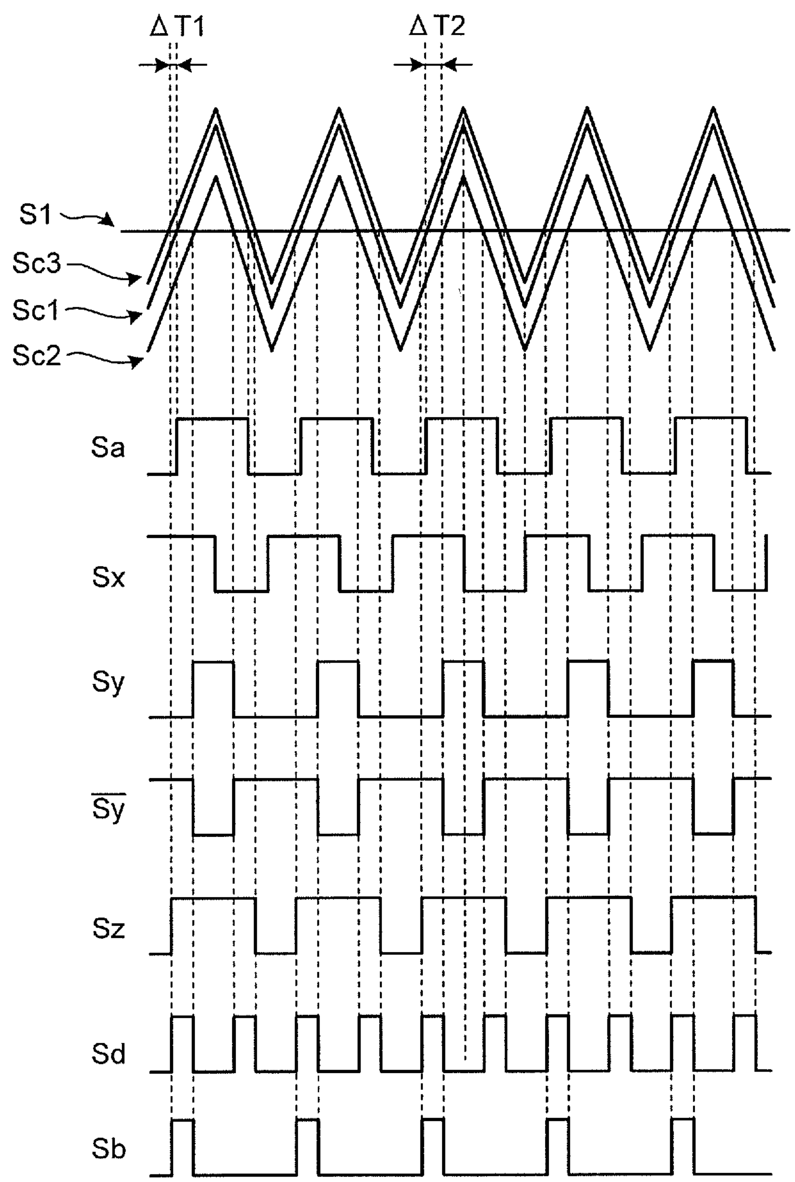
FIG. 7A is an example of a drive signal generated by the switch control unit shown in FIG. 6.

FIG. 7A is an example of a drive signal generated by a switch control unit having the configuration shown in FIG. 6.

In the generation operation of the switch drive signal performed by the switch control unit having the configuration shown in FIG. 6, for example, the reference-signal generation unit 201 first generates the reference signal S1 similar to the reference signal generated by the reference-signal generation unit $\mathbf{201}_1$ of the switch control unit shown in FIG. 4. Furthermore, the triangle-wave-signal generation units $\mathbf{202}_1$, $\mathbf{202}_2$, and $\mathbf{202}_3$ respectively generate a triangle-wave signal Sc1 (a first triangle-wave signal), a triangle-wave signal Sc2 (a second triangle-wave signal), and a triangle-wave signal Sc3 (a third triangle-wave signal). It is assumed that the respective triangle-wave signals have a fixed amplitude, a fixed cycle, and the same phase, and have a relation of Sc3≤Sc1≤Sc2. That is, it is assumed that the triangle-wave signals Sc1, Sc2, and Sc3 are in a relation that they can be obtained by sliding a certain triangle-wave signal in an amplitude direction. The state-memory enable-signal generation unit 203 generates a state-memory enable signal Sx similar to that generated by the state-memory enable-signal generation unit 203 of the switch control unit shown in FIG. 4.

The comparator $212_1$ generates the drive signal Sa based on the first triangle-wave signal Sc1 and the reference signal S1. Specifically, the comparator $212_1$ compares the first triangle-wave signal Sc1 with the reference signal S1, and when Sc1 is equal to or larger than S1 (Sc1≥S1), outputs the HI-level drive signal Sa (ON). On the other hand, when Sc1 is smaller than S1 (Sc1<S1), the comparator $212_1$ outputs the LO-level drive signal Sa (OFF).

Similarly, the comparator $212_2$ generates the signal Sy based on the second triangle-wave signal Sc2 and the reference signal S1. Specifically, the comparator $212_2$ compares the second triangle-wave signal Sc2 with the reference signal S1, and when Sc2 is equal to or larger than S1 (Sc2≥S1), outputs the HI-level signal Sy. On the other hand, when Sc2 is smaller than S1 (Sc2<S1), the comparator $212_2$ outputs the LO-level signal Sy. Furthermore, the comparator $212_3$ generates the signal Sz based on the third triangle-wave signal Sc3 and the reference signal S1. Specifically, the comparator $212_3$ compares the third triangle-wave signal Sc3 with the reference signal S1, and when Sc3 is equal to or larger than S1 (Sc3≥S1), outputs the HI-level signal Sz. On the other hand, when Sc3 is smaller than S1 (Sc3<S1), the comparator $212_3$ outputs the LO-level signal Sz.

The arithmetic-logic unit 220 generates the commutation signal Sb based on the signals Sx, Sy, and Sz. The operation is the same as the operation performed by the arithmetic-logic unit 220 of the switch control unit shown in FIG. 4.

In this manner, also when a plurality of triangle-wave signals are used, the timing adjustment of the switch drive signals Sa and Sb can be performed. Furthermore, the ON/OFF timings of the switch drive signals Sa and Sb can be adjusted by providing offsets having widths with respect to the triangle-wave signal Sc1 or time widths (in FIG. 7A, an example in which a time width between Sc1 and Sc3 is designated as ΔT1, and a time width between Sc1 and Sc3 is designated as ΔT2 is shown) to the triangle-wave signals Sc2 and Sc3.

Figure 7B:
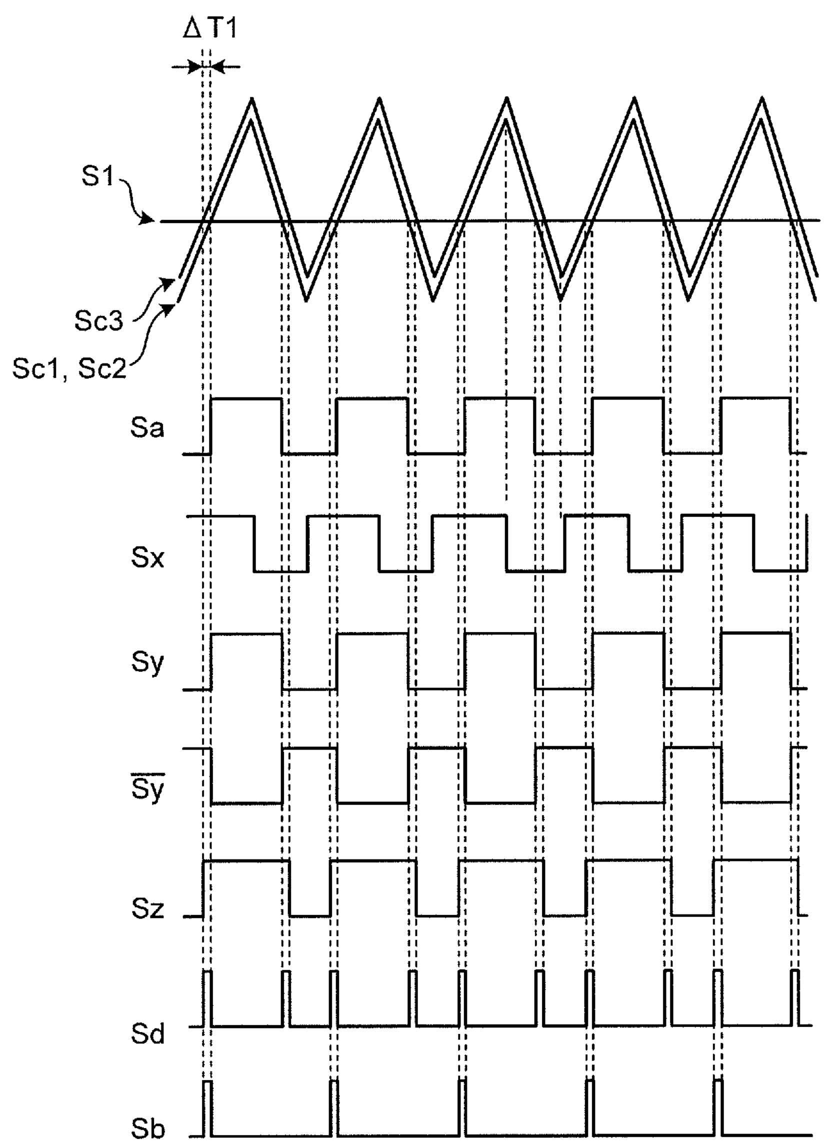
FIG. 7B is an example of a drive signal generated by the switch control unit shown in FIG. 6.

When it is desired to turn off the drive signal Sb without any delay, the triangle-wave signals Sc1, Sc2, and Sc3 only need to have a relation shown in FIG. 7B. That is, the OFF timing of the drive signal Sb and the ON timing of the drive signal Sa can be synchronized by overlapping the first triangle-wave signal Sc1 and the second triangle-wave signal Sc2 on each other (by setting ΔT2 to zero). When the current flowing through the booster circuit 2 does not need to be commutated toward the commutation unit 4 before closing the switch 22 by turning on the drive signal Sa (when the switch 44 does not need to be closed by turning on the drive signal Sb), the drive signal Sb can be turned off all the time by overlapping all the triangle-wave signals Sc1, Sc2, and Sc3 on each other (by setting ΔT1 and ΔT2 to zero).

Even when the switch control unit shown in FIG. 6 is used, the same control as that of a case where the switch control unit having the configuration shown in FIG. 4 is used can be performed, and the ON/OFF timings of the drive signals Sa and Sb can be changed by a relatively simple method. Accordingly, re-commutation due to variations in the characteristics of the drive circuit and the switching element can be prevented, and the recovery current can be suppressed highly reliably.

Figure 8:
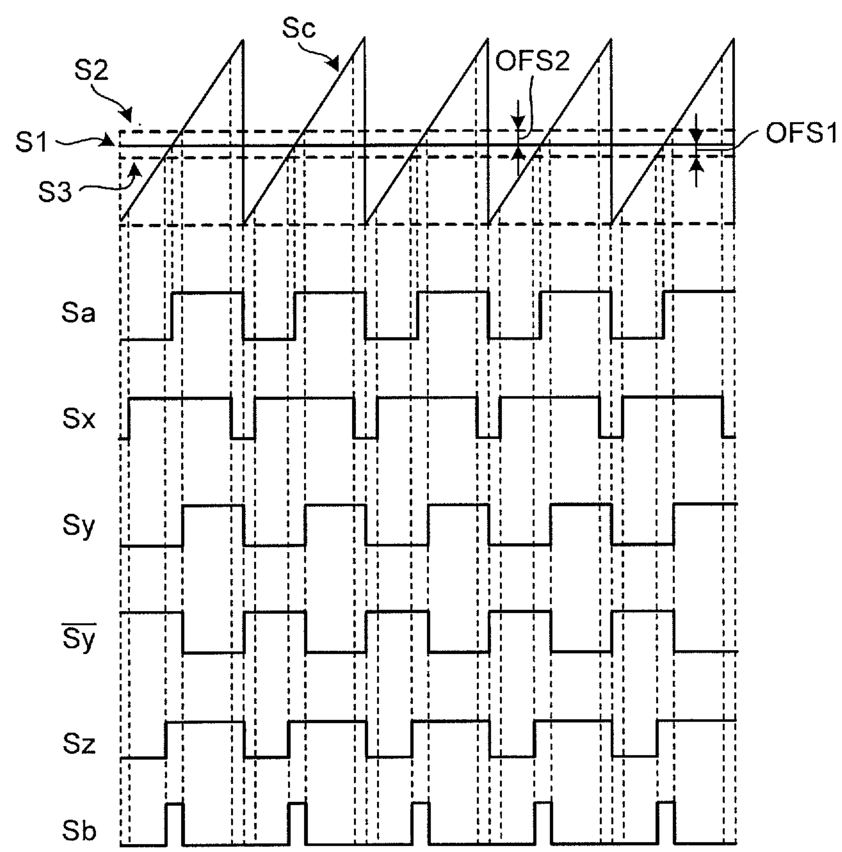
FIG. 8 is an example of a control operation using a sawtooth signal.
Figure 9:
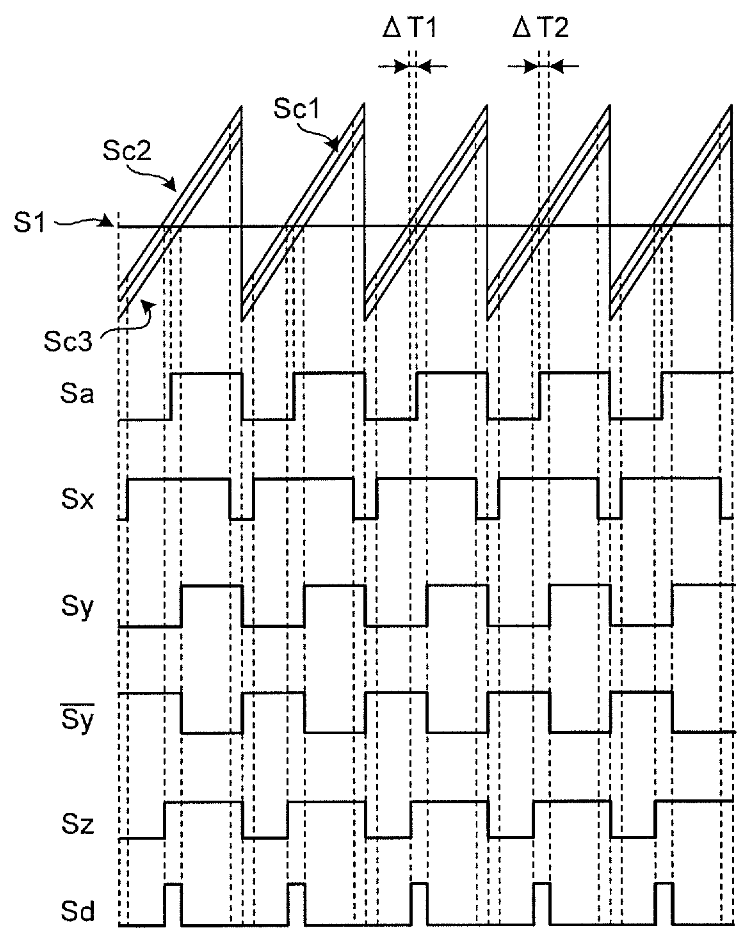
FIG. 9 is an example of a control operation using a sawtooth signal.

In the switch control unit shown in FIGS. 4 and 6, the reference signal and the triangle-wave signal are used. However, a sawtooth signal can be used instead of the triangle-wave signal. FIGS. 8 and 9 are examples of a control operation using a sawtooth signal. FIG. 8 is an example when the sawtooth signal is used instead of the triangle-wave signal in the switch control unit shown in FIG. 4. FIG. 9 is an example when the sawtooth signal is used instead of the triangle-wave signal in the switch control unit shown in FIG. 6. FIGS. 8 and 9 are examples in which the state-memory enable-signal generation unit 203 sets the state-memory enable signal Sx to an off state near a fall of the sawtooth signal and to an on state in other sections. However, the present invention is not limited thereto, and the state-memory enable signal Sx may be flexibly changed according to, for example, the operation specifications of a device connected as the load 9.

It is considered that an appropriate operation time of the commutation unit 4 is different based on operating conditions and system specifications.

Figure 10A:
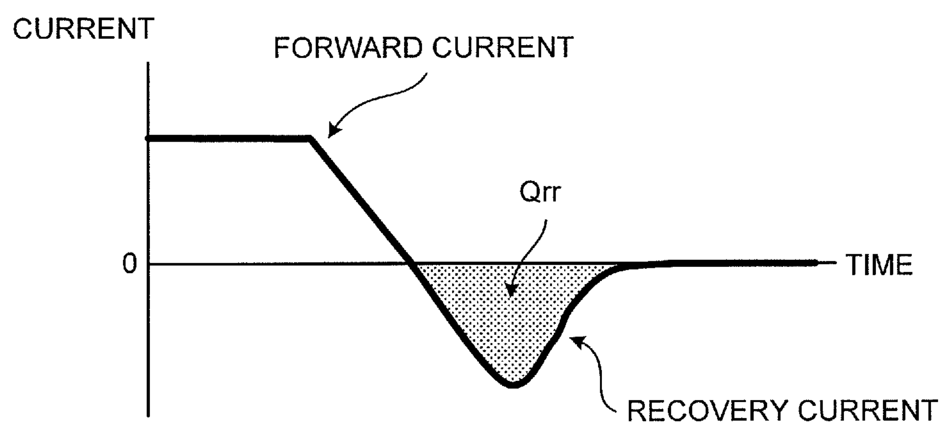
FIG. 10A depicts a relation between a forward current and a recovery current.
Figure 10B:
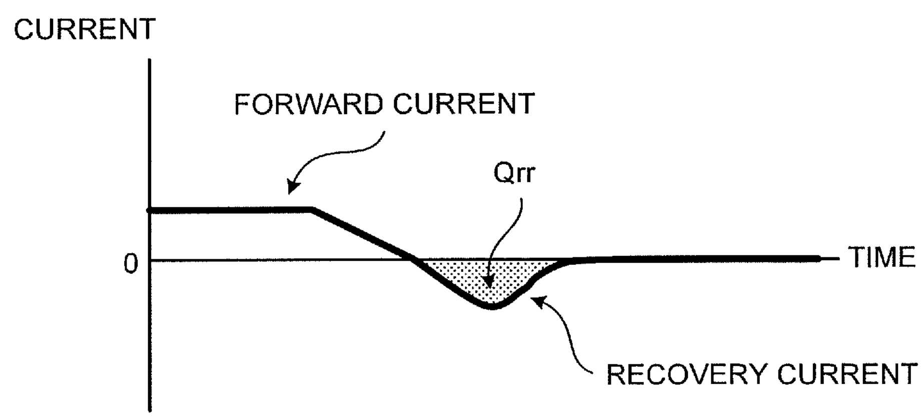
FIG. 10B depicts a relation between a forward current and a recovery current.

For example, when the current flowing through the rectifier 23 is large, commutation from the rectifier 23 to the rectifier 42 takes time, and thus it may be desired that the commutation time (a time during which the switch 44 is closed) is large (a compensation time of reverse recovery charge needs to be increased). On the other hand, when the current flowing through the rectifier 23 is small, the time required for commutation from the rectifier 23 to the rectifier 42 may be short (the compensation time of reverse-recovery charge needs to be decreased). That is, as shown in FIGS. 10A and 10B, when the forward current (corresponding to the current flowing through the rectifier 23) increases, a reverse recovery charge Qrr increases, and the recovery current also increases. Even if the commutation operation is not completely complete, required specifications of the system (a design value) may be sufficiently satisfied. In this manner, a pulse width of the commutation signal Sb becomes different according to the required specifications of the system.

Figure 11A:
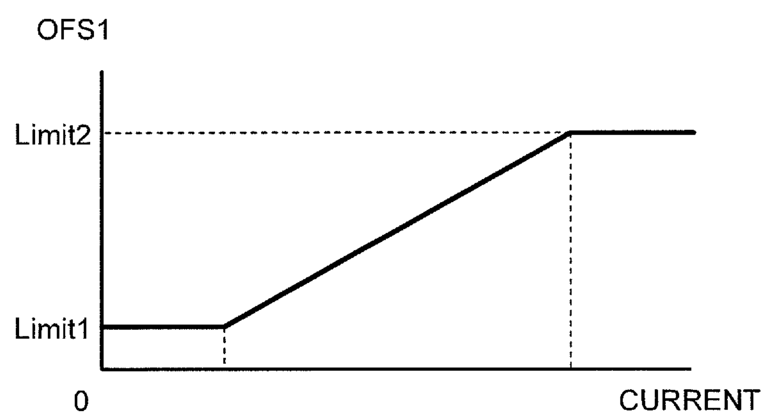
FIG. 11A is an example of a relation between a current and OFS1.
Figure 11B:
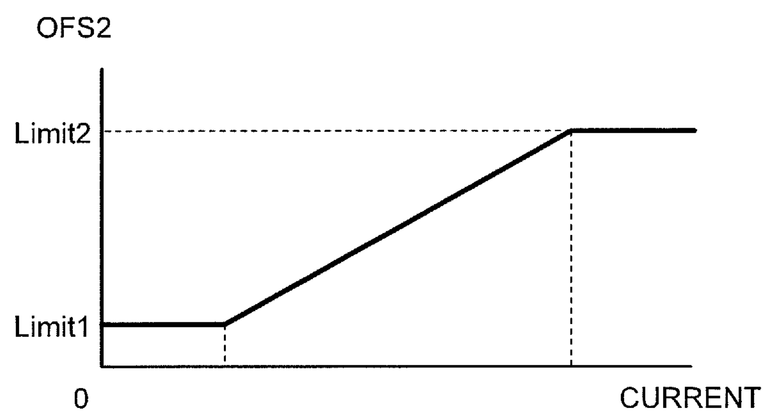
FIG. 11B is an example of a relation between a current and OFS2.

Accordingly, the commutation operation appropriate for the system can be realized by flexibly changing the commutation time to the commutation unit 4 depending on the magnitude of a load current, the switching speed of the switch 22, and element characteristics of the rectifier 23. For example, when the commutation time is changed depending on the magnitude of the load current, the change can be performed as shown in FIGS. 11A and 11B. FIG. 11A is an example of a relation between a current (a current observable by the current detection element 10 shown in FIG. 1) and the OFS1 (an offset value indicating a difference between the reference signals S1 and S3 when the control shown in FIGS. 5A and 5B is executed). FIG. 11B depicts a relation between the current and the OFS2 (an offset value indicating a difference between the reference signals S1 and S2). The relation between the current and the respective offset values can be obtained beforehand based on the performance of the respective devices constituting the circuit or by simulation or the like. In this manner, a system having higher efficiency can be constructed by changing the commutation time so that the pulse width of the commutation signal Sb increases as the load current increases. It is noted that current detection results in other positions can be used without departing from the scope of the present invention.

As described above, the power conversion device according to the present embodiment includes the booster circuit that boosts DC voltage supplied from the power supply, the commutation unit connected to the rectifier in the booster circuit in parallel so that the current flowing through the rectifier can be commutated at a desired timing, and the control unit that controls the booster circuit and the commutation unit. The control unit executes control so that a reverse bias is applied to the rectifier after the current flowing through the rectifier (the forward current) is commutated toward the commutation unit. Accordingly, the recovery current of the rectifier is suppressed, and an increase of the circuit loss due to the recovery current can be prevented. As a result, a power conversion device having high reliability and high efficiency can be realized.

In the present embodiment, an example of the generation operation of the drive signal Sa of the switch 22 and the drive signal (the commutation signal) Sb of the switch 44 in the switch control unit of the control unit 6 has been described. However, the switch control unit may be realized by using an internal function of a microcomputer or a DSP. For example, the signal may be generated by using a one-shot pulse generation function or the like attached to these devices.

Second Embodiment

Figure 12:
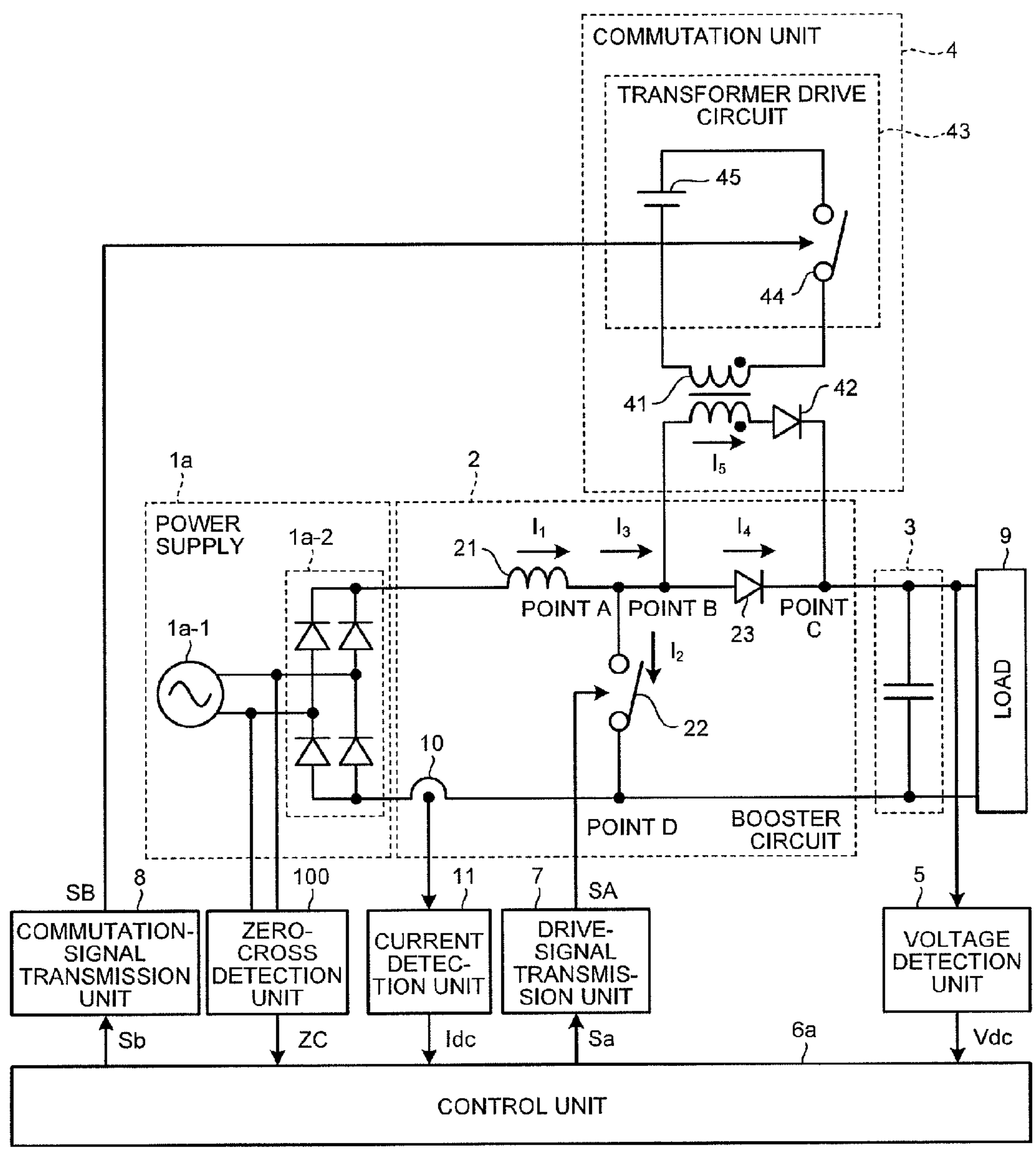
FIG. 12 is a configuration example of a power conversion device according to a second embodiment.

FIG. 12 depicts a configuration example of a power conversion device according to a second embodiment. The power conversion device according to the present embodiment is obtained by transforming the power conversion device explained in the first embodiment. Specifically, in the power conversion device, the power supply 1 and the control unit 6 are replaced by a power supply 1*a* and a control unit 6*a*, and a zero-cross detection unit 100 is added. In the present embodiment, only elements different from those of the power conversion device described in the first embodiment are explained.

As shown in FIG. 12, the power supply 1*a* includes an AC power supply 1*a*-1 (a single-phase power supply), and a rectifier 1*a*-2 (having a bridge connection provided therein) including a plurality of rectifying elements. In the power supply 1*a*, AC power generated by the AC power supply 1*a*-1 is rectified by the rectifier 1*a*-2 and is supplied to the booster circuit 2 at the subsequent stage.

The zero-cross detection unit 100 monitors a voltage output by the AC power supply 1*a*-1 to detect a zero-cross point. The monitoring result is output to the control unit 6*a* as a zero cross signal ZC. The control unit 6*a* generates the drive signals Sa and Sb synchronized with the zero-cross point based on the zero cross signal ZC. Generation of noise can be suppressed by executing control synchronized with the zero-cross point.

Figure 13:
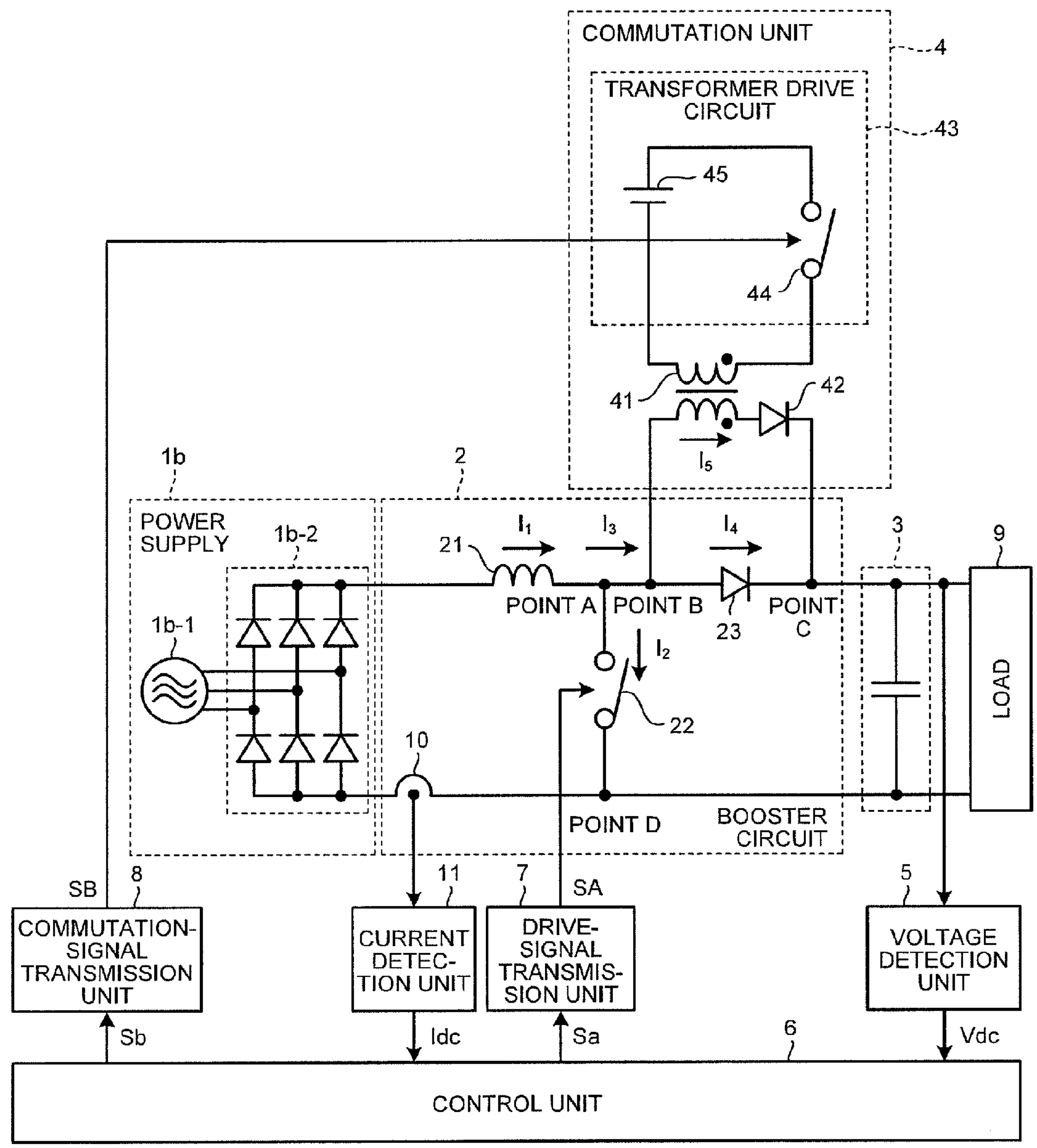
FIG. 13 is a configuration example of a power conversion device according to a third embodiment.

As shown in FIG. 13, the power supply 1 of the power conversion device explained in the first embodiment can be replaced by a power supply 1*b*. The power supply 1*b* includes an AC power supply 1*b*-1 (a three-phase power supply), and a rectifier 1*b*-2 (having a bridge connection provided therein) including a plurality of rectifying elements. Three-phase AC power generated by the AC power supply 1*b*-1 is rectified by the rectifier 1*b*-2 and is supplied to the booster circuit 2 at the subsequent stage.

Also in the power conversion device shown in FIGS. 12 and 13, as in the power conversion device according to the first embodiment shown in FIG. 1, the ON/OFF timing of the respective signals of the booster circuit 2 and the commutation unit 4 can be adjusted, and the same effect as that of the power conversion device according to the first embodiment can be obtained.

In the present embodiment, the configuration example of the power conversion device that boosts the power supplied from the single-phase or three-phase AC power supply is shown. However, the present technique can be applied to a circuit having a configuration including a backflow prevention rectifier in various convertors having a step-up/step-down function, and by adjusting the ON/OFF timing of the respective drive signals of the booster circuit and the commutation unit, the system efficiency can be improved and the recovery current and noise can be reduced.

In the explanations of the respective embodiments, it is assumed that the power supply is included in the power conversion device for convenience sake. However, the power supply can be provided outside of the power conversion device.

As described above, according to the power conversion device explained in the respective embodiments, the pulse width of a booster signal (corresponding to the drive signal Sa) for controlling the booster circuit and the commutation signal (corresponding to the drive signal Sb) for controlling the commutation unit can be changed according to the operating conditions. Accordingly, re-commutation at the time of completion of commutation due to variations in the characteristics of the circuit and the element can be prevented, and the recovery current can be suppressed highly reliably.

According to the power conversion device explained in the respective embodiments, because the commutation time of the commutation unit can be adjusted depending on the magnitude of the load current, the recovery current can be suppressed highly reliably, while preventing excessive heat generation of the commutation unit. Furthermore, because excessive heat generation can be prevented, heat dissipation measures for the commutation unit can be taken inexpensively. Further, higher efficiency can be realized by using a wide bandgap semiconductor as an auxiliary rectifier.

According to the power conversion device explained in the respective embodiments, because the ON/OFF timing of the commutation signal, which is a control signal at the timing of commutating the current flowing in the rectifier in the booster circuit, is set to be variable, the commutation time of the commutation unit can be adjusted according to the switching speed of the switching element of the booster circuit, and the power conversion device can flexibly respond to system changes.

According to the power conversion device explained in the respective embodiments, because the ON/OFF timing of the commutation signal can be adjusted by a relatively simple method, the switch control unit can be realized by using the one-shot pulse generation function or the like of a microcomputer, thereby enabling to realize the control unit, while suppressing a cost increase.

According to the power conversion device explained in the respective embodiments, the unit that generates a plurality of reference signals and the unit that generates the triangle-wave signal (or the sawtooth signal) are provided, and the control signal of the switching element and the commutation signal are generated based on the comparison result between the reference signal and the triangle-wave signal (or the sawtooth signal). Accordingly, the power conversion device has high general versatility and can be applied to various systems.

According to the power conversion device explained in the respective embodiments, because the power conversion device can be accommodated to a DC power supply or an AC power supply and a rectifying circuit that rectifies the voltage of the AC power supply, the power conversion device has high general versatility and can be applied to various systems. Therefore, by applying the power conversion device to a refrigeration/air-conditioning system, a refrigeration/air-conditioning system having high efficiency and high reliability can be realized.

INDUSTRIAL APPLICABILITY

As described above, the power conversion device according to the present invention is useful as a device that converts an input voltage to a desired voltage, and is suitable as a power conversion device that performs a voltage conversion using a switching element.

REFERENCE SIGNS LIST

1, 1*a*, 1*b* power supply
1*a*-1 AC power supply (single-phase power supply)
1*b*-1 AC power supply (three-phase power supply)
1*a*-2, 1*b*-2 rectifier
2 booster circuit
3 smoothing circuit
4 commutation unit
5 voltage detection unit
6, 6*a* control unit
7 drive-signal transmission unit
8 commutation-signal transmission unit
9 load
10 current detection element
11 current detection unit
21 reactor
22, 44 switch
23, 42 rectifier
41 transformer
43 transformer drive circuit
$\mathbf{201}$, $\mathbf{201_1}$, $\mathbf{201_2}$, $\mathbf{201_3}$ reference-signal generation unit
$\mathbf{202}$, $\mathbf{202_1}$, $\mathbf{202_2}$, $\mathbf{202_3}$ triangle-wave-signal generation unit
203 state-memory enable-signal generation unit
$\mathbf{211_1}$, $\mathbf{211_2}$, $\mathbf{211_3}$, $\mathbf{212_1}$, $\mathbf{212_2}$, $\mathbf{212_3}$ comparator
220 arithmetic-logic unit
221 logic inversion unit
222 logical-product computation unit
223 state storage unit
100 zero-cross detection unit

The invention claimed is:

1. A power conversion device comprising:
a power supply unit;
a booster unit that boosts a voltage supplied from the power supply unit by switching control;
a smoothing unit that smoothes an output voltage from the booster unit;
a backflow prevention element that is arranged between the booster unit and the smoothing unit to prevent a current reverse flow toward the booster unit;
a commutation unit that is connected to the backflow prevention element in parallel to commutate a current flowing through the backflow prevention element in a predetermined period before a short-circuit current begins to flow in response to the switching control of the booster unit; and
a determination unit that determines a duty ratio of the switching control and an implementation period of a commutation operation by the commutation unit, based on a plurality of thresholds and a comparison target signal that is a triangle-wave signal or a sawtooth signal, wherein
the thresholds include a first threshold, a second threshold that is equal to or larger than the first threshold, and a third threshold that is equal to or smaller than the first threshold, and
the determination unit determines the duty ratio based on a comparison result between the first threshold and the comparison target signal, and determines the implementation period based on a comparison result between the third threshold and the comparison target signal.

2. The power conversion device according to claim 1, wherein
the booster unit includes
a reactor that is connected to the power supply unit, and
a switch that short-circuits a connection point between the reactor and the backflow prevention element and a negative side of the power supply unit.

3. The power conversion device according to claim 2, wherein the commutation unit commutates a current flowing through the backflow prevention element in a predetermined period before the switch is turned on.

4. The power conversion device according to claim 2, wherein the commutation unit finishes a commutation operation after a predetermined period has passed after the switch is turned on.

5. The power conversion device according to claim 1, wherein
the commutation unit includes
a transformer,
a switch that drives the transformer,
a power supply that supplies power to the transformer and the switch, and
a backflow prevention element that is serially connected to a secondary winding of the transformer to prevent a current reverse flow.

6. The power conversion device according to claim 5, wherein the backflow prevention element of the commutation unit is formed of a wide bandgap semiconductor.

7. The power conversion device according to claim 6, wherein the wide bandgap semiconductor is formed of silicon carbide, a gallium nitride-based material, or diamond.

8. The power conversion device according to claim 1, wherein the first threshold, the second threshold, and the third threshold are variable.

9. The power conversion device according to claim 1, further comprising an adjustment unit that adjusts a duty ratio of the switching control based on a comparison result between a voltage value having been smoothed by the smoothing unit and a predetermined target value.

10. The power conversion device according to claim 9, wherein the target value is variable.

11. The power conversion device according to claim 1, further comprising an adjustment unit that adjusts a duty ratio of the switching control based on a comparison result between a current value of a current flowing through the booster unit and a predetermined target value.

12. The power conversion device according to claim 11, wherein the target value is variable.

13. The power conversion device according to claim 1, wherein the determination unit is realized by using a one-shot pulse generation function of a microcomputer.

14. The power conversion device according to claim 1, wherein the power supply unit includes a DC power supply or an AC power supply and a rectifying circuit that rectifies a voltage of the AC power supply.

15. A refrigeration/air-conditioning system comprising the power conversion device according to claim 1.

16. A power conversion device comprising:

a power supply unit;

a booster unit that boosts a voltage supplied from the power supply unit by switching control;

a smoothing unit that smoothes an output voltage from the booster unit;

a backflow prevention element that is arranged between the booster unit and the smoothing unit to prevent a current reverse flow toward the booster unit;

a commutation unit that is connected to the backflow prevention element in parallel to commutate a current flowing through the backflow prevention element in a predetermined period before a short-circuit current begins to flow in response to the switching control of the booster unit; and a determination unit that determines a duty ratio of the switching control and an implementation period of a commutation operation by the commutation unit, based on a plurality of thresholds and a comparison target signal that is a triangle-wave signal or a sawtooth signal, wherein the determination unit includes a reference-signal generation unit that generates a plurality of reference signals as the thresholds, a comparison-target signal generation unit that generates the comparison target signal, a comparison unit that compares each of the thresholds with the comparison target signal to determine the duty ratio and the implementation period based on a comparison result, and a control-signal generation unit that generates a determination-result output control signal having a variable ON/OFF timing, which is a control signal instructing whether to output an implementation period determined by the comparison unit as an effective determination result.

17. A power conversion device comprising:

a power supply unit;

a booster unit that boosts a voltage supplied from the power supply unit by switching control;

a smoothing unit that smoothes an output voltage from the booster unit;

a backflow prevention element that is arranged between the booster unit and the smoothing unit to prevent a current reverse flow toward the booster unit;

a commutation unit that is connected to the backflow prevention element in parallel to commutate a current flowing through the backflow prevention element in a predetermined period before a short-circuit current begins to flow in response to the switching control of the booster unit; and a determination unit that determines a duty ratio of the switching control and an implementation period of a commutation operation by the commutation unit, based on a threshold and a plurality of comparison target signals, each of which is a triangle-wave signal or a sawtooth signal, wherein the plurality of comparison target signals include a first comparison target signal, a second comparison target signal having a phase and an amplitude coincident with those of the first comparison target signal and always having a level equal to or larger than that of the first comparison target signal, and a third comparison target signal having a phase and an amplitude coincident with those of the first comparison target signal and always having a level equal to or smaller than that of the first comparison target signal, and the determination unit determines the duty ratio based on a comparison result between the threshold and the first comparison target signal, and determines the implementation period based on a comparison result between the threshold and the second comparison target signal and a comparison result between the threshold and the third comparison target signal.

18. The power conversion device according to claim 17, wherein the levels of the first comparison target signal, the second comparison target signal, and the third comparison target signal are variable.

* * * * *